(12) United States Patent
Jobbágy et al.

(10) Patent No.: US 8,208,638 B2
(45) Date of Patent: Jun. 26, 2012

(54) SET OF EQUIPMENT FOR SECURE DIRECT INFORMATION TRANSFER OVER THE INTERNET

(76) Inventors: Miklós Jobbágy, Kecskemét (HU); Gábor Kuti, Jászberény (HU); János Zelenák, Budapest (HU)

( * ) Notice: Subject to any disclaimer, the term of this patent is extended or adjusted under 35 U.S.C. 154(b) by 907 days.

(21) Appl. No.: 10/591,541

(22) PCT Filed: Nov. 2, 2004

(86) PCT No.: PCT/HU2004/000101
§ 371 (c)(1),
(2), (4) Date: Sep. 1, 2006

(87) PCT Pub. No.: WO2005/083972
PCT Pub. Date: Sep. 9, 2005

(65) Prior Publication Data
US 2007/0277030 A1 Nov. 29, 2007

(30) Foreign Application Priority Data
Mar. 1, 2004 (HU) .................................. 0400489

(51) Int. Cl.
*H04L 9/08* (2006.01)
(52) U.S. Cl. ........ 380/279; 380/286; 380/277; 380/278; 380/280; 380/281; 380/282; 380/283; 380/284; 380/285; 380/30; 380/44; 370/328; 455/517; 455/518; 455/519; 705/53; 705/57; 705/59; 705/71; 705/51; 713/176; 713/156

(58) Field of Classification Search ................... 713/153
See application file for complete search history.

(56) References Cited

U.S. PATENT DOCUMENTS

| | | | |
|---|---|---|---|
| 4,578,530 A | 3/1986 | Zeidler | 705/71 |
| 5,161,193 A * | 11/1992 | Lampson et al. | 713/151 |
| 6,219,786 B1 * | 4/2001 | Cunningham et al. | 713/152 |
| 6,240,514 B1 | 5/2001 | Inoue et al. | 713/153 |
| 2002/0055366 A1* | 5/2002 | Maggenti et al. | 455/517 |
| 2003/0163684 A1* | 8/2003 | Fransdonk | 713/153 |

FOREIGN PATENT DOCUMENTS

| | | |
|---|---|---|
| EP | 1328101 A2 | 7/2003 |
| WO | WO 99/62222 | 12/1999 |
| WO | WO 00/41383 | 7/2000 |

* cited by examiner

*Primary Examiner* — Nathan Flynn
*Assistant Examiner* — Bryan Wright
(74) *Attorney, Agent, or Firm* — Joseph G. Seeber

(57) ABSTRACT

A set of equipment for secure direct information transfer over the Internet contains information transmitting terminal devices for collaborating with an information forwarding network, taking part in the information traffic. The individual information transmitting terminal devices are equipped with a sender partial unit, a receiver partial unit and a storage partial unit comprising an ID-register containing a device identification signal, a C-register for storing a coding key and a D-register for storing a decoding key. The C-register containing the coding key is connected to the sender partial unit, and a coding key and a collaborating decoding key are allocated to each individual information transmitting terminal device.

9 Claims, 1 Drawing Sheet

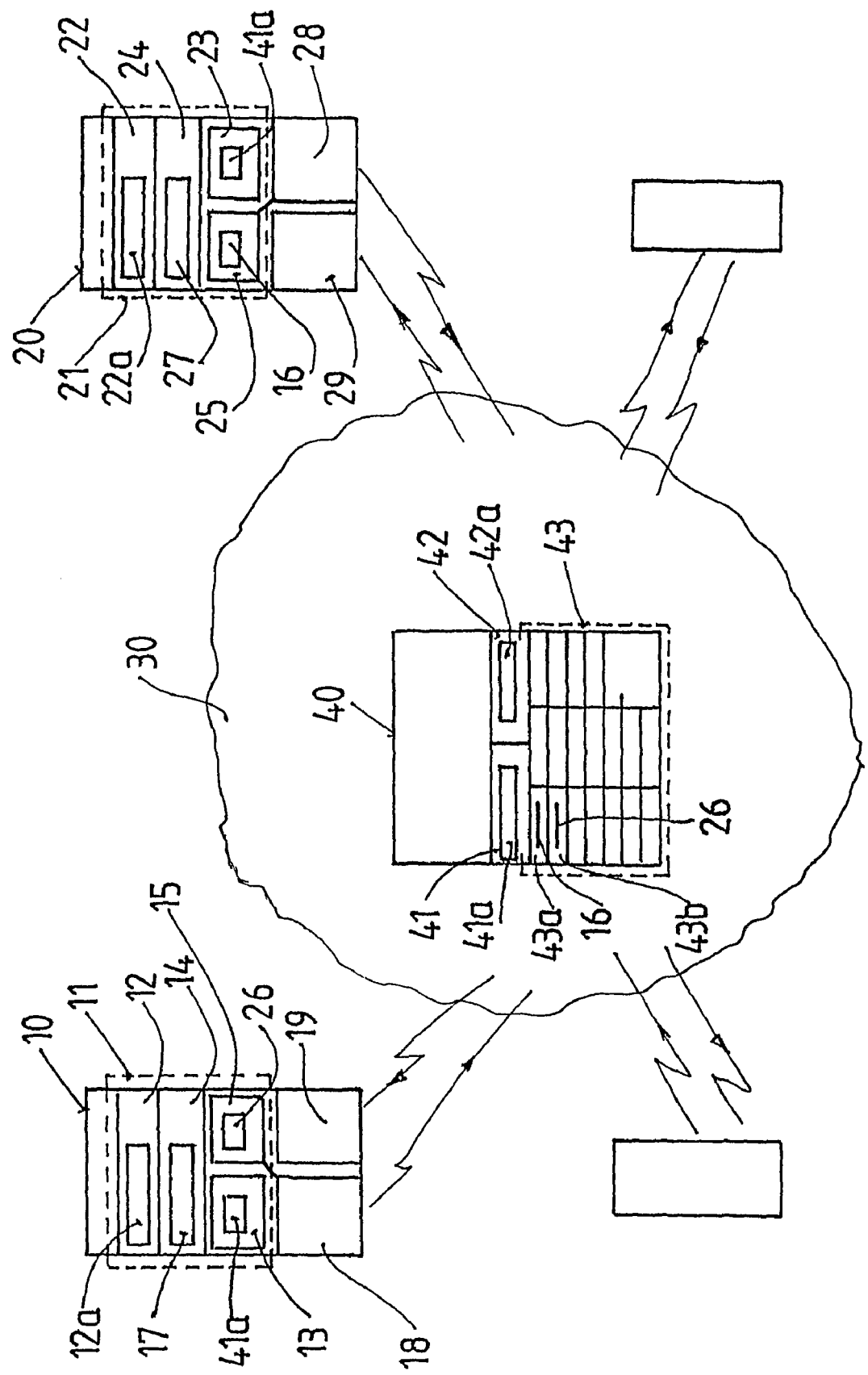

SET OF EQUIPMENT FOR SECURE DIRECT INFORMATION TRANSFER OVER THE INTERNET

TECHNICAL FIELD

The subject of the invention is a set of equipment for secure direct information transfer over the Internet, which contains information transmitting terminal devices suitable for collaborating with an information forwarding network, taking part in the information traffic, the individual information transmitting terminal devices are equipped with a sender partial unit, a receiver partial unit and a storage partial unit comprising an ID-register containing a device identification signal, a C-register suitable for storing a coding key and a D-register suitable for storing a decoding key, where the C-register containing the coding key is in connection with the sender partial unit, and a coding key and a collaborating decoding key are allocated or assigned to the individual information transmitting terminal devices, the storage partial unit of each information transmitting terminal device is completed with one or more temporary storage registers for the temporary storage of the coding keys of other information transmitting terminal devices, while the information forwarding network is completed with at least one central traffic co-ordinating unit, the central traffic co-ordinating unit has an MD-register storing a master decoding key and a memory unit containing base cells for storing the coding keys belonging to the individual information transmitting terminal devices and a master coding key collaborating with the master decoding key is allocated or assigned to the central traffic co-ordinating unit, and the C-registers of the information transmitting terminal devices are provided with a master coding key collaborating with the master decoding key stored in the MD-register of the central traffic co-ordinating unit.

RELATED ART

Due to technical development, especially the development of computer technology and telecommunication electronic equipment are becoming widely used, with the help of which sound and other signal transmission solutions can be realised. In some of these solutions not the ordinary public telecommunication networks are used, and in certain cases, e.g.: for transmitting bank information and making transactions, the transmitted data is coded or encrypted.

International patent No. WO 00/41383 describes a solution with the help of which, in the case that there is appropriate private branch exchange between two telephone sets, the communication chain can be established in a way that after initiating a call first the control unit of the branch exchange finds a remote access database indexing telephone numbers and Internet addresses, there it tries to find the called number, and if it can identify it, then reading the Internet address belonging to the telephone number it established the telephone call over the Internet rather than over the public telephone network, and if it does not find such a telephone number—Internet identifying connection, then it establishes the telephone call over the ordinary public telephone network.

However, the disadvantage of the solution is that if there is no Internet access to the dialed telephone number, then the connection is established in the ordinary way, over the public telephone network, which always results in extra costs for the calling party.

A further disadvantage is that for a cost friendly solution, beside the Internet accessibility of the calling and the called party, traditional telephone connection is also needed, and even individual special private branch exchanges need to be established, which results in a significant increase of the investment costs and also requires further operation and maintenance expenses.

Another significant disadvantage of the solution is that the encryption of the data traffic connection is not solved, and so the traffic can be tapped, it is easily accessible for unauthorised third parties, and by this the established signal forwarding line cannot be used for transmitting optional data.

Another solution is described in international patent application No. WO99/62222 relates to the encryption of telephone traffic. Its main point is that the individual users are given their own password, which they must enter for the central unit in every case after they log in, for the purpose of identifying themselves. The identified users are provided with limited access time from the central unit, during which time their data traffic is encrypted.

However, the greatest disadvantage of this solution is that the period of encrypted data traffic is restricted in time, which in the case when longer connection is needed excludes the possibility of confidential information transfer.

A further disadvantage is that in this case the users must log in the system themselves, and then they must send the central unit a password, which was given to them, so other parties may also know it, and because of the possibility of using a password accessible to other parties confidential data traffic becomes uncertain, and it becomes questionable whether this channel can be used exclusively by a given device or user.

Patent document EP 1.328.101 is also known, this presents a set of equipment that realises coded information transfer with the combination of centralised communication networks similar to the traditional telephone system and the TAN number system known in the financial sphere.

The disadvantage of this solution is that it uses a single key algorithm for the coding of the communication, and it stores all the keys for this in a single place, in the call complex. In this way the system is vulnerable via the call complex, all the communication taking place in the network can be decoded from inside the call complex or while in the possession of the call complex or its data.

Another significant disadvantage of this solution is that the symmetrical keys needed for the decoding of the encrypted communication are required to travel continuously between the elements of the network, and so they can be obtained resulting in the encrypted messages becoming decidable for unauthorised persons, which is inadmissible from the point of view of the system.

A further disadvantage of the solution is that all communication takes place through the call complex, so the data transfer capacity of the call complex is continually burdened in proportion with the number of communications taking place at any specific point in time.

DISCLOSURE OF INVENTION

On the basis of the above our aim with the invention was to overcome the deficiencies of the known solutions and to create a set of equipment with the help of which a connection realising sound, signal or other data traffic can be established in a way identical to ordinary telephoning, so that encrypted information traffic becomes possible independently from the time needed for the connection, during its complete period, and such use always takes place over the Internet, avoiding the public telephone network, which always involves using costs.

The idea behind the invention is based on the recognition that if a suitably constructed central computer unit and terminal devices suitable for establishing Internet-based connection are provided with coding and decoding keys in a way different from the known solutions, then a situation can be achieved where Internet-based communication can be realised in the course of which the sound, still picture, moving picture, signal or other data traffic between the calling party and the called party in connection with each other takes place in an encrypted way impossible to disassemble from the time when the connection is established until it is ended, so that the users of the system do not have any encryption keys or passwords that could be appropriated and by this could endanger the integrity of the network, furthermore the central computer unit in itself is suitable for controlling and managing communication between the terminal devices, and so the task can be solved.

In accordance with the set aim the set of equipment according to the invention for secure direct information transfer over the Internet, B which contains information transmitting terminal devices suitable for collaborating with an information forwarding network, taking part in the information traffic, the individual information transmitting terminal devices are equipped with a sender partial unit, a receiver partial unit and a storage partial unit comprising an ID-register containing a device identification signal, a C-register suitable for storing a coding key and a D-register suitable for storing a decoding key, where the C-register containing the coding key is in connection with the sender partial unit, and a coding key and a collaborating decoding key are allocated or assigned to the individual information transmitting terminal devices, the storage partial unit of each information transmitting terminal device is completed with one or more temporary storage registers for the temporary storage of the coding keys of other information transmitting terminal devices, while the information forwarding network is completed with at least one central traffic co-ordinating unit, the central traffic co-ordinating unit has an MD-register storing a master decoding key and a memory unit containing base cells for storing the coding keys belonging to the individual information transmitting terminal devices and a master coding key collaborating with the master decoding key is allocated or assigned to the central traffic co-ordinating unit, and the C-registers of the information transmitting terminal devices are provided with a master coding key collaborating with the master decoding key stored in the MD-register of the central traffic co-ordinating unit B is constructed in a way that in the storage partial unit of the individual information transmitting terminal devices there is only information free from the given information transmitting terminal devices own coding key, while only the coding key of the other information transmitting terminal device participating in the information exchange is temporarily stored in the temporary storage register of the first information transmitting terminal device, and only the coding key of the first information transmitting terminal device participating in the information exchange is temporarily stored in the temporary storage register of the other information transmitting terminal device, and so for the duration of the actual information exchange the first information transmitting terminal device and the other information transmitting terminal device are directly linked to one another permitting data flow without the mediation of the central traffic co-ordinating unit.

A further criterion of the set of equipment according to the invention may be that the temporary storage registers of the information transmitting terminal devices are connected to the sender partial unit.

In the case of a possible construction of the set of equipment the central traffic co-ordinating unit is provided with an MC-register storing a master coding key.

In another different realisation of the invention in the storage partial unit of the individual information transmitting terminal devices there is only information free from the given information transmitting terminal device's own coding key.

The greatest advantage of the set of equipment according to the invention is that with its use connection between the calling party and the called party can be established with simple means, as in the case of ordinary telephone use, but the costs of information flow are significantly lower, while it is guaranteed that the flow of data remains encrypted during the complete period of the connection.

It must also be regarded as an advantage that due to the information transmitting terminal device belonging to the set of equipment no further expensive additional elements need to be acquired, operated or maintained, which has a favourable influence on the expenses in connection with the use of the equipment.

It must also be regarded as an advantage that the specially constructed information transmitting terminal device itself, together with the central traffic co-ordinating unit, realises the encrypting of the data traffic, and so there is no need for a code, identifier or other additional key given to the users, also accessible to unauthorised parties. Another advantage deriving from this is that it cannot happen that the users cannot enter the system, because they forgot their own code.

A further favourable characteristic of the invention is that the data traffic between the two end points does not take place through a central exchange, which accelerates the flow of information and improves the security of the system, makes the data impossible to disassemble and makes the system impossible to tap.

It is also a disadvantage that as a result of the special nature of the set of equipment according to the invention the terminal devices are impossible to use, if the central computer unit is avoided, which results in that the users of the terminal devices can enter the system only with the approval of the operator of the central computer unit.

A further advantage is that the set of equipment can be installed independently from the manufacturer so that the terminal devices and the central computer unit is uploaded with key pairs by a given operator, and so a closed network can be created, which makes communication possible only for a certain group of users.

BRIEF DESCRIPTION OF DRAWING

Below the set of equipment according to the invention is described in detail in connection of a construction example, on the basis of a drawing.

FIG. 1 shows a schematic picture of the arrangement of the set of equipment according to the invention.

DETAILED DESCRIPTION

FIG. 1 shows a version of the set of equipment according to the invention, in the case of which—for the sake of simplicity—only one call initiating information transmitting terminal device 10 and one call receiving information transmitting terminal device 20 is detailed. However, it is clear that the set of equipment can contain an optional number of information transmitting terminal devices 10. The number of information transmitting terminal devices is only restricted by the capacity of the central traffic coordinating unit 40.

Connection between the information transmitting terminal device 10 and the information transmitting terminal device 20 is established by the information forwarding network 30, with the help of the central traffic co-ordinating unit 40. The information forwarding network 30 can be an optional communication network, which in this case can mean a wired or wireless, private or public network. The only requirement with respect to the information forwarding network 30 is that it should be suitable for transmitting the signals to be forwarded at a high data rate used in telecommunication, possibly free from distortion.

It can be seen in FIG. 1 that the central traffic coordinating unit 40 is a high-capacity computer device, which has an MC-register 41 and an MD-register 42 on the one part and contains a memory unit 43 on the other part. In the MC-register 41 there is a master coding key 41a, while in the MD-register 42 there is a master decoding key 42a. This unique key-pair enables the information transmitting terminal device 10 and the information transmitting terminal device 20 to realise encrypted data traffic with the central traffic co-ordinating unit 40. In the memory unit 43 of the central traffic co-ordinating unit 40 there is a base cell 43a and another base cell 43b, in which the coding key 16 of the information transmitting terminal device 10 and the coding key 26 of the information transmitting terminal device 20 can be found in a resident way.

However, it must be pointed out here that the master coding key 41a and the MC-register 41 containing it 41 does not necessarily have to be situated in the central traffic co-ordinating unit 40. The MC-register and the master coding key 41a can be situated remote from the central traffic co-ordinating unit so that the master coding key 41a and the master decoding key 42a are not accessible on the same place.

Similarly to traditional telephone sets the information transmitting terminal device 10 has a keyboard, microphone and sound emitter—not shown here—and apart from these it also has a storage partial unit 11, a sender partial unit 18 and a receiver partial unit 19. The storage partial unit 11 also has an ID-register 12 for recording the device identification signal 12a and a D-register 14 containing the information transmitting terminal device's 10 own decoding key 17. The C-register 13 suitable for the temporary or permanent storage of the master coding key 41a of the central traffic co-ordinating unit 40 also belongs here, as well as the temporary storage register 15, which is responsible for storing the coding key 26 of the other terminal device performing actual data traffic—in our case this is the information transmitting terminal device 20—during the connection. Practically the temporary storage register 15 of the information transmitting terminal device 10 should be connected to the sender partial unit 18.

Practically the structural construction of the information transmitting terminal device 20 is the same as that of the information transmitting terminal device 10. Similarly to traditional telephone sets it also has a keyboard, microphone and sound emitter—not shown here either—and a storage partial unit 21, a sender partial unit 28 and a receiver partial unit 29. The ID-register 22, the D-register 24 and the temporary storage register 25 belong to the storage partial unit 21. The ID-register records the unique device identifying signal 22a of the information transmitting terminal device 20, while the D-register 24 carries the information transmitting terminal device's 20 own decoding key 27. The coding key 16 of the currently connected information transmitting terminal device 10—in our case—can be found in the temporary storage register 25. And in this case too the C-register 23 is for the temporary or permanent storage of the master coding key 41a. From the aspect of the information transmitting terminal device 20 it is favourable, if the temporary storage register 25 is in connection with the sender register 28.

In the course of a possible realisation of the operation of the set of equipment the information transmitting terminal device 10 acts as the call initiating unit, and the information transmitting terminal device 20 acts as the called unit, but the set of equipment is also suitable for establishing several signal forwarding connections simultaneously, that is for establishing so-called conference connection.

Dialing the unique identifying number, e.g.: telephone number, of the information transmitting terminal device 20 or the device identifying signal 22a of the information transmitting terminal device 20 on the information transmitting terminal device 10, it sends its login through the information forwarding network to the central traffic co-ordinating unit 40 in a way that the information transmitting terminal device 10 codes the login message with the help of the master coding key 41a situated in the C-register 13 of the information transmitting terminal device, and it furthers the coded signal through the sender partial unit 18 to the central traffic co-ordinating unit 40.

With the help of the master decoding key 42a recorded in its MD-register 42 the central traffic co-ordinating unit 40 disassembles the message coded with the master coding key 41a. On the one part on the basis of the content of the message it identifies the information transmitting terminal device 10 on the basis of its own device identifying signal 12a, and on the other part it checks whether an information transmitting terminal device 20 really belongs to the received device identifying signal 22a, and if yes, according to the device identifying signal 22a it finds the coding key 26 of the information transmitting terminal device 20 in the base cell 43b of the memory unit 43. The central traffic co-ordinating unit 40 encrypts the coding key 26 of the information transmitting terminal device 20 with the help of the coding key 16 of the information transmitting terminal device 10 and sends it to the receiver partial unit 19 of the information transmitting terminal device 10. The receiver partial unit 19 of the information transmitting terminal device 10 disassembles the received information with the help of its decoding key 17 and by this it gains temporary access to the coding key 26 of the information transmitting terminal device, which it stores in the temporary storage register 15 of the information transmitting terminal device.

The call initiating information transmitting terminal device 10 tries to get in contact with the information transmitting terminal device 20 through the information forwarding network 30. If the information transmitting terminal device 10 cannot get in contact with the information transmitting terminal device 20 belonging to the device identifying signal 22a, then the connection cannot be established.

In the case that the information transmitting terminal device 10 has managed to get in contact with the information transmitting terminal device 20, then it sends its own device identifying signal 12a encrypted with the coding key 26 of the information transmitting terminal device 10 to the information transmitting terminal device 20. The information transmitting terminal device 20 disassembles it with its own decoding key 27 and then coding it with the help of the master coding key belonging to the central traffic co-ordinating unit 40 it sends it through the information forwarding network 30 to the central traffic co-ordinating unit 40, and requests the coding key 16 of the information transmitting terminal device 10 from it.

In accordance with the device identifying signal 12a received from the information transmitting terminal device 20 the central traffic co-ordinating unit 40 selects the coding key 16 of the information transmitting terminal device from the base cell 43a of the memory unit 43. Then the central traffic coordinating unit 40 encrypts the coding key 16 of the information transmitting terminal device 10 with the help of the coding key 26 of the information transmitting terminal device 20, and sends it to the information transmitting terminal device 20. The information transmitting terminal device 20 receives the encrypted message sent by the central traffic coordinating unit 40 in its receiver partial unit 29, disassembles it with its own decoding key 27 as a result of which it gets to know the coding key 16 of the call initiating information transmitting terminal device 10, which it stores temporarily in the temporary storage register 25 of the information transmitting terminal device 20 in a way impossible to read.

After the coding key 16 has been sent to the information transmitting terminal device 20 and the coding key 26 has been sent to the information transmitting terminal device 10 the information transmitting terminal device 10 can encrypt its information to be sent to the information transmitting terminal device 20 with the help of the coding key 26, so that now the information can be sent through the sender partial unit 18 straight to the information transmitting terminal device 20, which in its receiver partial unit 29 receives the data sent from the sender partial unit 18 of the information transmitting terminal device 10 through the information forwarding network 30—and coded with the coding key 26 of the information transmitting terminal device 20—it can disassemble it and so it becomes easily interpretable for the person or equipment using the information transmitting terminal device 20.

The information transmitting terminal device 20 can answer the information received from the information transmitting terminal device 10 so that it encrypts the data it intends to send with the help of the coding key 16 situated in the temporary storage register 25, sends it to the sender partial unit 28, from there to the information forwarding network 30, and then it is directly furthered to the receiver partial unit 19 of the information transmitting terminal device 10. It tries to disassemble the data arriving at the receiver partial unit 19 with the decoding key 17 of the information transmitting terminal device 10, and it succeeds, then the data can be easily interpreted by the person or equipment using the information transmitting terminal device 10.

This direct signal traffic between the information transmitting terminal device 10 and the information transmitting terminal device 20 through the information forwarding network is realised in a way that the central traffic co-ordinating unit 40 does not take part in it. The information transmitting terminal device 10 and the information transmitting terminal device 20 temporarily get to know each other's coding key 16 and coding key 26, and they are able to realise direct information exchange. After the termination of the traffic between information transmitting terminal device 10 and the information transmitting terminal device 20 the coding key 26 situated in the temporary storage register 15 of the information transmitting terminal device 10 is deleted, and the same happens with the coding key 16 situated in the temporary storage register 25 of the information transmitting terminal device 20.

After finishing the call of the information transmitting terminal device 10, in the information transmitting terminal device 20 only its own decoding key 27 situated in the D-register 24 and the master coding key 41*a* situated in the C-register 23 remain. At the same time the information transmitting terminal device 10 only keeps its own decoding key 17 situated in the D-register 14 and the master coding key 41*a* situated in the C-register 13.

On the basis of describing the process it can be seen that in the course of establishing data forwarding the information transmitting terminal device 10, the information transmitting terminal device 20 and the central traffic coordinating unit 40 do not get in a position even for a moment when they have a coding-decoding key pair belonging together at the same time. So it is not possible for anyone of the users of the set of equipment to have access to the coding key 16 and the decoding key 17, or the coding key 26 and the decoding key 27 at the same time.

It is obvious that the central traffic coordinating unit 40 is able to store and administrate network addresses needed for network access, determined by the characteristics of the information forwarding network 40, and forward the addresses needed for establishing connection towards the information transmitting terminal devices 10 and 20.

In the interest of increasing security even more, it can also be solved that the central traffic co-ordinating unit 40 does not contain the master coding key 41*a* and the master decoding key 42*a* at the same time. Knowing only one member of the coding-decoding key pairs makes it impossible to decrypt encrypted messages.

The invention claimed is:

1. A system for secure direct information transfer over an Internet, comprising information transmitting terminal devices for collaborating with an information forwarding network and for taking part in information traffic, each information transmitting terminal device comprising a sender partial unit, a receiver partial unit and a storage partial unit; wherein said storage partial unit comprises an ID-register containing a device identification signal, a C-register for storing a coding key, and a D-register for storing a decoding key; wherein the C-register storing the coding key is connected to the sender partial unit, and a respective coding key and a respective collaborating decoding key are assigned to a corresponding information transmitting terminal device; wherein the storage partial unit of each information transmitting terminal device includes at least one temporary storage register for the temporary storage of the coding keys of other information transmitting terminal devices; wherein the information forwarding network includes at least one central traffic coordinating unit having an MD-register for storing a master decoding key and a memory unit including base cells for storing the coding keys belonging to individual information transmitting terminal devices; wherein a master coding key collaborating with the master decoding key is allocated to the central traffic coordinating unit, and the C-registers of the information transmitting terminal devices are provided with a master coding key collaborating with the master decoding key stored in the MD-register of the central traffic coordinating unit, wherein, in the storage partial unit of a first information transmitting terminal device, there is only information which is free from the coding key of the first information transmitting terminal device, while only the coding key of a second information transmitting terminal device participating in an information exchange is temporarily stored in the temporary storage register of the first information transmitting terminal device; and wherein only the coding key of the first information transmitting terminal device participating in the information exchange is temporarily stored in the temporary storage register of the second information transmitting terminal device; whereby, for the duration of actual information exchange, the first information transmitting terminal device and the second information transmitting terminal device are directly linked to one another so that data flow without the mediation of the central traffic coordinating unit is provided.

2. The system as recited in claim 1, wherein the temporary storage registers of the information transmitting terminal devices are connected to the sender partial unit.

3. The system as recited in claim 2, wherein the central traffic coordinating unit is provided with an MC-register for storing a master coding key.

4. The system as recited in claim 1, wherein the central traffic coordinating unit is provided with an MC-register for storing a master coding key.

5. The system as recited in claim 1, wherein the coding key of a given information transmitting terminal device is never stored in said given information transmitting terminal device.

6. The system as recited in claim 1, wherein the respective coding key and the respective collaborating decoding key are never stored together in a same location.

7. The system as recited in claim 1, wherein the respective collaborating decoding key is stored in its information transmitting terminal device from the outset, and the respective coding key is stored in the central traffic coordinating unit at the outset but is sent to another information transmitting terminal device which does not have the respective collaborating decoding key.

8. The system as recited in claim 1, wherein the respective collaborating decoding key is stored in its information transmitting terminal device from he outset, and the respective coding key is stored in the central traffic coordinating unit at the outset but is sent to another information transmitting terminal device which does not have the respective collaborating decoding key.

9. The system as recited in claim 1, wherein said coding keys and said decoding keys comprise asymmetric keys.

* * * * *